United States Patent
Green

[15] 3,641,445
[45] Feb. 8, 1972

[54] FREQUENCY ANALYZER

[72] Inventor: Joseph A. Green, Adelphi, Md.

[73] Assignee: International Telephone and Telegraph Corporation, Nutley, N.J.

[22] Filed: July 23, 1970

[21] Appl. No.: 57,658

[52] U.S. Cl. ............................328/140, 324/77 B, 324/77 E, 324/83 Q, 328/166, 328/167
[51] Int. Cl. ........................................................H03b 3/04
[58] Field of Search..................328/140, 138, 166, 165, 167; 307/233, 295; 324/77 B, 77 E, 78 F, 83 Q

[56] References Cited

UNITED STATES PATENTS

| | | | |
|---|---|---|---|
| 3,492,591 | 1/1970 | Shapiro | 328/166 X |
| 2,964,622 | 12/1960 | Fire | 328/165 X |
| 3,384,824 | 5/1968 | Grenier | 328/166 X |
| 3,418,574 | 12/1968 | Wyckoff | 324/77 E |

*Primary Examiner*—Stanley T. Krawczewicz
*Attorney*—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

A frequency analyzer is provided wherein real-time, narrow band-pass filters having large dynamic range are synthesized for each frequency. Each filter consists of a local clock driven synchronous detector followed by a simple integrating circuit. Large dynamic range is achieved through the use of a two-state switching device as the synchronous detector. Since the output of the synchronous detector depends on the phase relationship between the input signal and the local clock, two phase-quadrature filters are provided for each frequency. The output from the filter pair is processed in a manner that yields a signal whose amplitude is independent of the input signal-local clock phase relationship.

6 Claims, 1 Drawing Figure

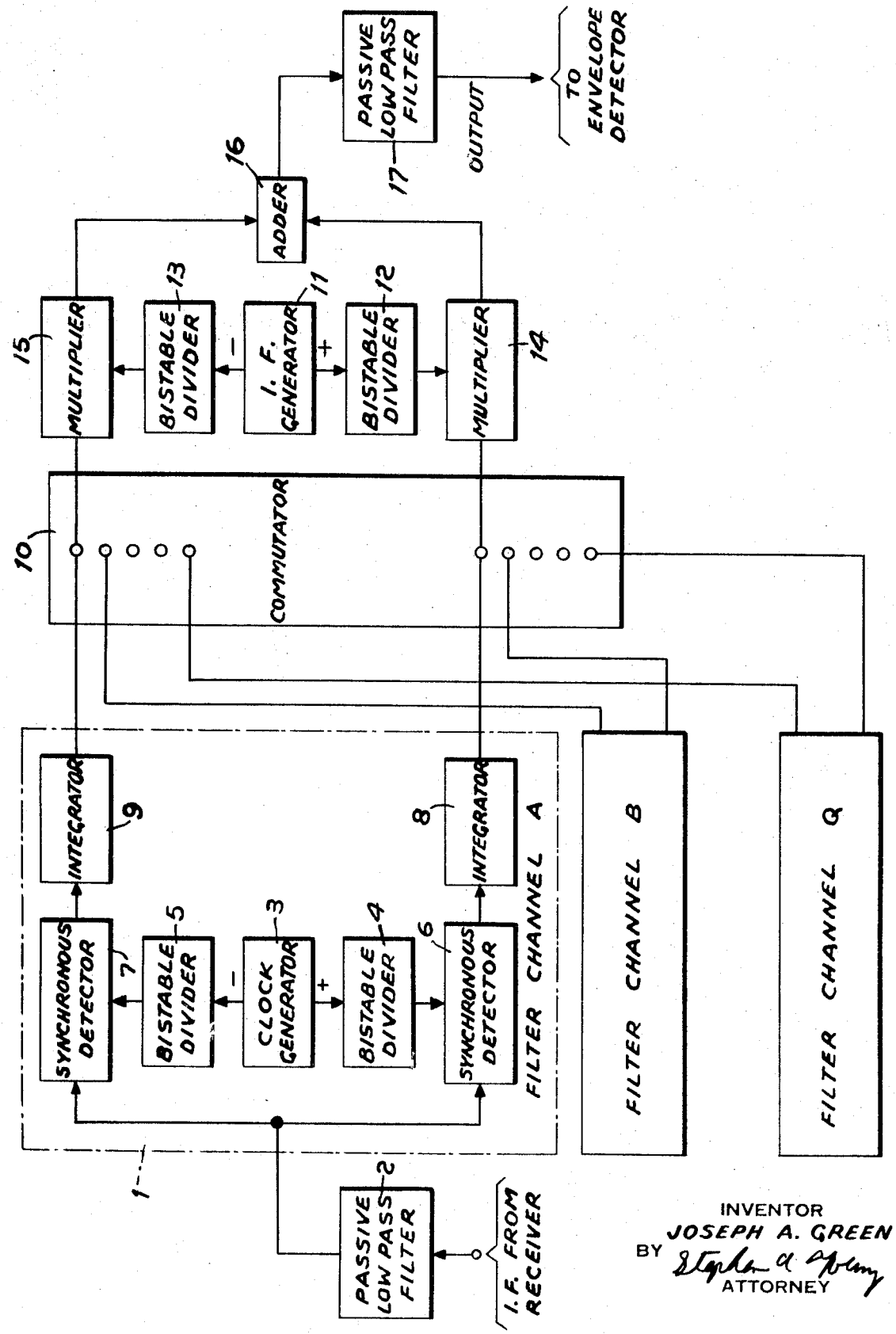

FREQUENCY ANALYZER

BACKGROUND OF THE INVENTION

This invention relates generally to a frequency discriminator and more particularly to a high resolution, real-time frequency analyzer having large dynamic range.

In order to perform significant frequency analysis of signals such as HF radar signals, it has often been necessary to increase the spectral dispersion of the real-time-signal so that adequate effective resolution could be achieved with analog frequency analyzers of the type now available having relatively limited intrinsic resolution. Such a situation will arise whenever it is necessary to separate closely spaced frequency components, for example, in separating signals involving slightly different doppler shifts.

The desired increase in dispersion can be accomplished by tape recording the real-time signal at one tape transport velocity and playing it back into a frequency analyzer at a greater velocity. While this practice enhances the effective resolution of the analog analyzer, it is somewhat cumbersome and real-time frequency analysis is necessarily precluded.

Alternatively, the spectral dispersion increase may be effected in approximately real-time through the use of a digital memory bank into which a digitalized version of the input signal is entered at the real-time rate followed by a readout operation that is performed more rapidly. Most implementations of this sort are restricted by the capacity of the memory bank that can be economically provided.

A further distinct disadvantage that can be cited regarding this alternate method lies in the complex circuitry that is required to interface the digital memory with an otherwise analog system.

SUMMARY OF THE INVENTION

It is an object of the present invention to provide a device capable of performing real-time frequency discrimination without recourse to increased spectral dispersion through the use of complicated time compression techniques.

It is a further object of the present invention to provide a high resolution real-time frequency analyzer consisting of adjacent filter channels.

According to a broad aspect of the invention there is provided a frequency discriminator comprising two phase-quadrature filters coupled to an input signal for converting said input signal into two phase-quadrature components, and means for summing said phase-quadrature components.

This and other features of the present invention will be more clearly understood from the following detailed description taken in conjunction with the drawing in which:

BRIEF DESCRIPTION OF THE DRAWING

The sole drawing is a block diagram representation of a multichannel real-time frequency analyzer.

DESCRIPTION OF THE PREFERRED EMBODIMENT

A high resolution real-time frequency analyzer is shown in the drawing as consisting of adjacent filter channels A, B,—Q, each operating at slightly different clock frequencies. Each individual channel consists of a pair of local clock driven synchronous detectors, (two-state switches) followed by simple integrating circuits. The task of band limiting has thus been relegated to baseband circuitry where long integration intervals are readily achieved with passive components. A pair of phase-quadrature detectors and associated integrators are provided for each channel, since the output of a single synchronous detector depends on the phase relationship existing between the input signal and the local clock. The output from each of the detectors is processed and combined in a manner to produce a composite response in which the amplitude is independent of the input signal-local clock phase relationship.

Referring to the drawing, that portion contained within dotted box 1 must be repeated for each channel. The remaining components are used in common by all of the channels. A real-time input signal from a source, such as receiver IF, is fed to a passive low-pass filter 2 for the purpose of eliminating signal components corresponding to the third and higher order harmonics of the frequency band of interest that could produce an ambiguous response by interacting with harmonic components of the reference voltage supplied to the synchronous detector.

The quadrature switching drive, necessary for each channel is conveniently obtained through the use of a square wave clock generator 3, operated at twice the desired filter frequency, followed by a frequency division by a factor of two provided by bistable divider circuits 4 and 5 at each of the oppositely phased outputs of clock generator 3. The resulting waveforms are fed into synchronous detectors 6 and 7. These phase-quadrature waveforms produced by bistable dividers 4 and 5 are in phase quadrature and recur at the desired filter frequency. Each synchronous detector will generate an output which is dependent on the phase relationship existing between the input signal and the local clock and contain components having frequencies equivalent to the sum and difference of the input signal frequency and the local clock frequency.

The output of synchronous detectors 6 and 7 are fed to integrator circuits 8 and 9 respectively. These may consist of purely passive cascaded RC networks. Each integrator circuit eliminates the corresponding sum-frequency component and averages the corresponding low-frequency component over a time period equivalent to its time constant, said time constant being for example, 2 seconds. Since the integrators are designed to yield narrow filter bandwidths, the rate of change of their output is restricted and, hence, a relatively slow commutation rate is allowed for without information loss via commutator 10. Commutation may be performed mechanically or through the use of sequentially operated FET switches.

The method of combining the quadrature channel outputs clearly separates amplitude and local clock signal phase effects. Quadrature "IF carriers" are produced at a convenient frequency by means of IF generator 11 and frequency division by a factor of two by bistable divider circuits 12 and 13 in a manner similar to that described for producing the quadrature reference signals. The square wave outputs from bistable divider circuits 12 and 13 and corresponding integrator outputs are fed to multipliers 14 and 15 via commutator 10. Each multiplier produces an output whose amplitude is proportional to the corresponding integrator output. The multiplier outputs are then summed in arithmetic adder 16.

Since binary switching is involved in the production of "IF carriers," the adder output signal is filtered in passive low-pass filter 17 to eliminate the third or higher order harmonics of the "IF frequency." Finally, if only amplitude information is required, the output of filter 17 can be fed to an envelope detector.

A frequency analyzer employing the inventive concepts described above has been designed to display frequencies in the range of 80–129.5 Hz., centered about 105 Hz. There are 100 filter channels spaced 0.5 Hz. apart. Tests have indicated a dynamic range in excess of 40 db. The input signal amplitude was limited to 6 volts, peak-to-peak, so as to provide an undistorted output.

While I have described above the principles of the invention in connection with specific apparatus, it is to clearly understood that this description is made only by way of example and not as a limitation to the scope of the invention as set forth in the objects and accompanying claims.

I claim:

1. A frequency discriminator comprising:
   two phase-quadrature filters coupled to an input signal for converting said input signal into two phase-quadrature components;
   means for generating two phase-quadrature square waves;

a first and second multiplying means each coupled to one of said square waves and one of said phase-quadrature filter outputs for generating outputs each proportional to the amplitude of corresponding phase-quadrature filter outputs; and an arithmetic adder coupled to the outputs of said first and second multiplier means, said arithmetic adder having an output whose amplitude and fundamental frequency are independent of the phase of said input signal.

2. A frequency discriminator according to claim 1 where each of said phase-quadrature filters includes:

a source of a reference signal each in phase quadrature and having the same preselected frequency;

a synchronous detector coupled to said reference signal and said input signal for generating an output containing sum and difference frequencies; and an integrator circuit coupled to the output of said synchronous detector for eliminating the sum-frequency component and averaging the difference frequency component over a time period equivalent to the time constant of the integrator circuit.

3. A frequency discriminator according to claim 1 further comprising:

means coupled to said input signal for eliminating signal components corresponding to higher order harmonics of the frequency band of interest; and means coupled to said arithmetic adder for eliminating higher order harmonics and producing a sinusoidal output having a fundamental frequency and amplitude independent of the phase of said input signal.

4. A frequency discriminator according to claim 1 including:

a plurality of pairs of phase-quadrature filters wherein a local clock associated with each pair is tuned to a different frequency; and a commutator for coupling the outputs of each of said plurality of phase-quadrature filters sequentially to said summing means.

5. A method of spectrum analysis comprising the steps of:

comparing the frequency of an input signal with two phase-quadrature reference signals, each of said reference signals having the same frequency;

generating a signal containing components having frequencies equal to the sum and difference frequencies of said input signal and each of said reference signals, the amplitude of said signal being a function of the phase difference between said input signal and each of said reference signals;

eliminating each sum-frequency component;

averaging each difference frequency component over a predetermined period of time;

generating two phase-quadrature square waves;

multiplying each of said average difference frequency component by a different one of said phase-quadrature square waves; and summing the multiplied signals to produce an output signal having an amplitude and functional frequency independent of the phase of said input signal.

6. A method according to claim 5 further comprising the step of eliminating third or higher order harmonics from said input and output signals.

* * * * *